United States Patent [19]

Gibson et al.

[11] Patent Number: 4,587,181
[45] Date of Patent: May 6, 1986

[54] LEAD ACID RECOMBINATION CELLS

[75] Inventors: Ian K. Gibson; Kenneth Peters, both of Worsley, England

[73] Assignee: Chloride Group Public Limited Company, London, England

[21] Appl. No.: 676,422

[22] Filed: Nov. 29, 1984

[30] Foreign Application Priority Data

Nov. 29, 1983 [GB] United Kingdom ............... 8331785

[51] Int. Cl.$^4$ ............................................ H01M 10/14
[52] U.S. Cl. ..................................... 429/59; 429/140; 429/238
[58] Field of Search ................. 429/137, 140, 59, 238

[56] References Cited

U.S. PATENT DOCUMENTS 2,120,822  6/1938  Wheat ................................. 429/140
4,373,015  2/1983  Peters et al. ......................... 429/57

FOREIGN PATENT DOCUMENTS 2062945  5/1981  United Kingdom .

OTHER PUBLICATIONS

International Publication No. WO80/02472, Nov. 13, 1980, Peters et al.

Primary Examiner—Donald L. Walton
Attorney, Agent, or Firm—Finnegan, Henderson, Farabow, Garrett & Dunner

[57] ABSTRACT

A lead acid recombination cell of motive power type comprises a sealed container containing negative plates alternating with tubular positive plates comprising a plurality of parallel tubes of porous material which contain active material and along the interior of each of which a conductive spine extends. Adjacent plates are separated by compressible fibrous absorbent material and the cell contains substantially no free unabsorbed electrolyte whereby substantially all the electrolyte is absorbed in the plates and separator material.

4 Claims, 1 Drawing Figure

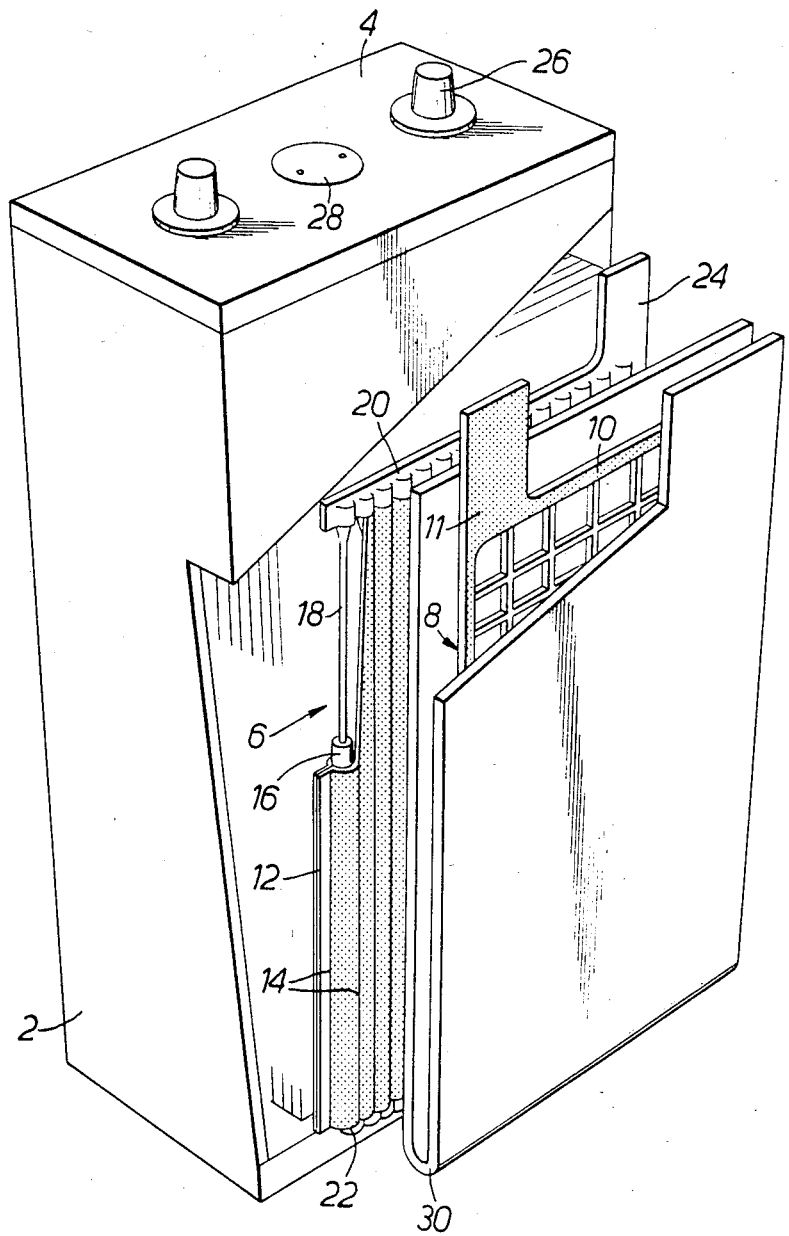

LEAD ACID RECOMBINATION CELLS

The present invention relates to lead acid recombination cells. Recombination cells are those in which gas evolved on charging is not vented to atmosphere but is induced to recombine within the cell. Such cells contain a reduced amount of electrolyte such that substantially all the electrolyte is absorbed in the electrodes and separators.

Recombination automotive batteries of lead acid type are known and one such battery is disclosed in British Pat. No. 2062945 of the present applicants. Such batteries comprise a plurality of cells connected in series, each cell comprising a plurality of alternating, flat positive and negative plates, typically about 1.5 mm thick, interleaved with microfine fibre separator material, typically about 1.2 mm thick in its uncompressed state. When such a battery is assembled the separator material is compressed, typically to between 50 and 75% of its uncompressed thickness because a tight intimate contact between the entire area of the plates and the separator material is believed to be essential if the capillarity of the separator material is to be able effectively to maintain sufficient electrolyte in contact with the plates for their electrochemical requirements. The separator material also has a sufficient void space to permit oxygen to diffuse through it towards the negative plates but affords a relatively low resistance pathway between adjacent plates of opposite polarity.

Whilst the prior specification referred to above is primarily applicable to lead acid automotive batteries it might be thought that the technology would be applicable to any type of lead acid battery with substantially flat plates and it is indeed believed that, for instance, a flat plate lead acid recombination motive power cell or battery could be manufactured. A motive power cell is one which has a large ampere-hour capacity for motive power purposes and whilst it is electrochemically very similar to an automotive battery its physical construction is very different to cope with the large current that it delivers for extended periods and the repeated deep cycling, that is to say deep discharge followed by full recharge, to which it is subjected, usually on a daily basis.

However, conventional lead acid motive power cells are frequently of tubular type, that is to say it comprises flat negative plates alternating with so called tubular positive plates. Tubular plates are those plates in which the active material is not simply pasted onto a retaining grid of lead or lead alloy but is retained within a plurality of parallel interconnected tubes of porous material, e.g. a woven or non-woven fabric, along the axis of each of which a respective conductive spine extends. All the conductive spines are connected to a current collecting bar which is in turn connected to a current take-off lug by which, in use, the plate is connected to further such plates in the conventional manner.

In use, battery plates are subject to corrosive and mechanical forces and in general it is the effect of these forces which determines the service life of the battery. The magnitude of the forces depends on the manner in which the battery is used and is very much larger in those batteries which are regularly deeply discharged, e.g. motive power batteries. The forces referred to above act primarily on the positive plates of a battery and thus tubular lead acid motive power cells with negative plates of conventional type comprising a cast grid of lead or lead alloy bearing active material alternating with positive plates of tubular type are found to have an extended service life. The reason for this is that the tubes can expand as the active material within them expands and thus more positively retain the active material and prevent shedding of the active material and it is shed active material which can cause the ultimate failure of the battery by depleting the positive plate capacity and/or constituting a short circuit path between adjacent plates.

Recombination cells and batteries have considerable advantages over their conventional counterparts which are flooded with electrolyte, particularly as regards the elimination of the loss of electrolyte by gassing on recharge which avoids the necessity of repeated topping up of the electrolyte and reduces the possibility of an explosion occurring if the evolved gases should come into contact with a flame or spark. These advantages are of particular value in connection with motive power cells since such cells are very regularly deeply discharged and subsequently charged but for various reasons it has been believed that it is not possible to manufacture a lead acid recombination tubular cell.

Thus it has always been believed that to operate effectively the separator material of a recombination cell must be in contact with the entire active area of the plates with a contact pressure that is even over the entire area of the plates and that by virtue of the surface configuration of tubular plates which is inherently corrugated it would be impossible to ensure that the separator material contacts their entire surface area or that even if such contact were achieved the contact pressure would inherently vary considerably over the area of the plates. It was believed that such variation of contact pressure would result in certain areas of the positive plates being provided with either insufficient electrolyte for their electrochemical requirements or an amount of electrolyte in excess of that at which the recombination mechanism can operate effectively.

It might also be thought that the fabric defining the tubes accommodating the active material of the positive plates would impede the migration of oxygen to the positive active material and thus impede the recombination mechanism.

Due to the differing charging and discharging regimes to which automotive batteries and motive power cells are subjected the plates in the latter are very much thicker than those in the former and thus have a smaller ratio of the surface area of the plates to the total volume of active material. It was believed that this reduced ratio coupled with the high rate at which gas is produced when recharging a motive power cell would result in the recombination mechanism operating at a rate substantially less than that of the gas evolution in a recombination motive power cell or alternatively that such a cell would have to be charged at an unacceptably low rate at top of charge.

Finally, the lead alloy in lead acid batteries commonly includes a proportion of antimony, primarily to improve the mechanical handling characteristics of the plates. The presence of antimony is of very much greater importance in motive power cells since it enhances the castability of the lead alloy and thus enables the relatively long and slender conductive spines to be cast without problem and it increases the cycle life which is of considerable importance in a cell which is regularly deeply cycled. However, antimony depresses the hydrogen overpotential at the negative plates and increases the rate at which gas is evolved and it has been conventionally believed both in the industry and in the patent literature (e.g. British Pat. No. 1364283) that no such impurity may be present in a recombination cell. Although it has in recent years been suggested that a lead acid recombination cell may in fact be able to tolerate a low content of antimony it has been believed that it would not be possible for such a cell to include the proportion of antimony which it is conventional and desirable to provide in a tubular plate motive power cell.

According to the present invention a lead acid recombination cell, e.g. a motive power cell, comprises negative plates alternating with positive plates of the type comprising a plurality of parallel tubes of porous material which contain active material and along the interior of each of which a conductive spine extends, adjacent plates being separated by compressible fibrous absorbent separator material and the cell containing substantially no free unabsorbed electrolyte whereby substantially all the electrolyte is absorbed in the plates and separator material.

The height of the positive plates may be in excess of 30 cm and the conductive spines may be made of lead alloy containing 2% or more by weight antimony. Adjacent pairs of plates are preferably separated by sheets of separator material which has been compressed and whose uncompressed thickness is in excess of 2 or 3 mm.

Thus expressed in its simplest form, the present invention resides in the provision of a lead acid recombination tubular plate cell and is based on the recognition that the various expected disadvantages and reasons why such a cell should not operate effectively referred to above do not arise or are incorrect.

The separator material is preferably a microfine glass fibre material of the type disclosed in the prior specification referred to above and is pressed into contact with the plates. The contact pressure is either not uneven or any unevenness of the contact pressure is found not to have the expected deleterious effects. It is also found that the fabric defining the tubes of the positive plates does not impede the migration of oxygen from the positive active material and indeed that the presence of this fabric has a positive beneficial effect in that it impedes the migration of antimony to the negative plates and thus permits the lead alloy of the positive plates to have an antimony content higher than expected without adversely affecting the performance of the cell. The separator material is found to remain adequately wetted with electrolyte, even in those areas which are more than 28 cm high and stratification of the electrolyte is found not to present a significant problem. It is found to be desirable that the separator material is between two and three times as thick as that between the plates of a recombination automotive battery because the plates of such a cell tend to be thicker and thus to carry more active material per unit area than the plates of an automotive battery.

Further features and details of the present invention will be apparent from the following description of one specific embodiment which is given by way of example with reference to the accompanying drawing which is a cut-away, partly exploded perspective view of a motive power or traction cell in accordance with the present invention.

Structurally, the cell is similar to a conventional motive power cell of the type which is flooded with electrolyte and it thus comprises a rectangular container 2 which is sealed by a lid 4 and within which are alternating positive and negative plate 6 and 8 respectively, there being one more negative plate than positive plates. The negative plates comprise conventional rectangular cast grids 10 affording a plate lug 11 and carrying negative active material, which is not shown for the sake of simplicity, whilst the positive plates are of conventional tubular plate form made from two sheets of fabric 12 of e.g. multifilament polyester yarn in which a plurality of rows of stitches 14 were made to define a plurality of interconnected parallel tubes. Each tube contains conventional positive active material 16 and extending axially within each tube and along its full length is a conductive spine 18 of lead alloy having an antimony content of e.g. 2% by weight. All the conductive spines are integral at one end with a current collecting bar 20 which extends along the top of the plate and which is manufactured by a casting process. The ends of the tubes remote from the current collecting bar are closed by a tube end bar 22 of conventional type comprising an integral moulding of polypropylene or the like affording a plurality of spigots which fit into and close the ends of respective tubes and locate respective conductive spines against movement within their tubes. Projecting from each current collecting bar is a plate lug 24 and all the lugs of the positive and negative plates are connected by respective plate straps (not shown for the sake of clarity) in the conventional manner. The two plate straps are connected to respective cell terminals 26 which project through and are sealed to the lid 4. The cell differs from a conventional motive power cell in that the container is sealed and its lid is provided with a non-return valve 28 of any appropriate type, e.g. bunsen type, adapted to vent the interior of the cell at a pressure of e.g. 0.1 bar but to prevent the entry of air into the cell. A respective sheet of microfine glass fibre separator material 30 about 3 mm thick is wrapped around each negative plate whereby adjacent positive and negative plates are separated by the separator material. During the assembly of the cell the plates and separators are compressed transverse to their planes thereby pressing the separator material into the recesses defined by the tubes of the positive plates thereby ensuring contact of the separator material with the entire area of the positive plates. The outer surface of the two outer negative plates is also contacted by separator material to ensure that these plates are provided with sufficient electrolyte for their electrochemical requirements. The cell contains sulphuric acid electrolyte in an amount such that substantially all of it is absorbed within the plates and separators so that there is substantially no free unabsorbed electrolyte. The container differs from a conventional motive power cell container in that its base is provided with no mud ribs. Mud ribs are conventionally provided to accommodate shed active material which might otherwise ultimately constitute a short circuit path between adjacent plates but by virtue of the fact that the positive active material is retained in the fabric tubes and that all the plates and separators are tightly packed into the container to ensure that the separator material remains in intimate contact with the plates the possibility of active material being shed is almost wholly eliminated.

In use, the discharge characteristics of the cell in accordance with the invention are substantially similar to those of a conventional cell.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by letters patent of the United States is:

1. A lead acid recombination cell comprising a sealed container containing electrolyte, negative plates and positive plates alternating with said negative plates, said positive plates comprising a plurality of parallel tubes of porous material having recesses between them and which contain active material and along the interior of each of which a conductive spine extends, adjacent plates being separated by sheets of compressible fibrous absorbent separator material having an uncompressed thickness in excess of 2 mm, with each separator being compressed between adjacent plates so that it is pressed into the recesses between the parallel tubes of the positive plates to ensure intimate contact of the separator with said plates, substantially all of said electrolyte being absorbed in said plates and said separator material and being present in an amount sufficient to establish electrical contact between the plates while leaving sufficient voids in the separator material for migration of oxygen gas.

2. A cell as claimed in claim 1 wherein the height of said positive plates is in excess of 30 cm.

3. A cell as claimed in claim 1 wherein said conductive spines are made of a lead alloy containing in excess of 2% by weight antimony.

4. A cell as claimed in claim 1, wherein the separator material is a microfine glass fiber separator material having an uncompressed thickness of about 3 mm.

* * * * *